United States Patent [19]

Breckinridge et al.

[11] Patent Number: 4,497,540
[45] Date of Patent: Feb. 5, 1985

[54] OPTICAL SYSTEM

[75] Inventors: James B. Breckinridge, La Canada; Norman A. Page, Monrovia, both of Calif.; Roland V. Shack; Robert R. Shannon, both of Tucson, Ariz.

[73] Assignee: The United States of America as represented by the Administrator of the National Aeronautics and Space Administration, Washington, D.C.

[21] Appl. No.: 478,130

[22] Filed: Mar. 23, 1983

[51] Int. Cl.³ .............................................. G02B 5/10
[52] U.S. Cl. ................................... 350/168; 350/505; 350/619; 356/323; 356/330; 356/331
[58] Field of Search ................ 250/226; 350/168, 294, 350/295, 503, 504, 505; 356/310, 323, 326, 330, 331

[56] References Cited

U.S. PATENT DOCUMENTS

| | | | |
|---|---|---|---|
| 2,743,646 | 5/1956 | Strong | 356/330 |
| 2,995,973 | 8/1961 | Barnes et al. | 356/331 |
| 3,048,080 | 8/1962 | White | 356/331 |
| 3,345,907 | 10/1967 | Wada | 356/323 |
| 3,837,744 | 9/1974 | Egan et al. | 356/310 |
| 3,865,490 | 2/1975 | Grossman | 350/293 |
| 3,951,526 | 4/1976 | Grossman | 350/293 |
| 4,029,389 | 6/1977 | Runciman | 350/294 |

Primary Examiner—Bruce Y. Arnold
Assistant Examiner—William Propp
Attorney, Agent, or Firm—Thomas H. Jones; Paul F. McCaul; John R. Manning

[57] ABSTRACT

Disclosed is an optical system used in a spacecraft to observe a remote surface and provide a spatial and spectral image of this surface. The optical system includes aspheric and spherical mirrors aligned to focus at a first focal plane an image of the surface, and a mirror at this first focal plane which reflects light back on to the spherical mirror. This spherical mirror collimates the light and directs it through a prism which disperses it. The dispersed light is then focused on an array of light responsive elements disposed at a second focal plane. The prism is designed such that it disperses light into components of different wavelengths, with the components of shorter wavelengths being dispersed more than the components of longer wavelengths to present at the second focal plane a distribution pattern in which preselected groupings of the components are dispersed over essentially equal spacing intervals.

32 Claims, 11 Drawing Figures

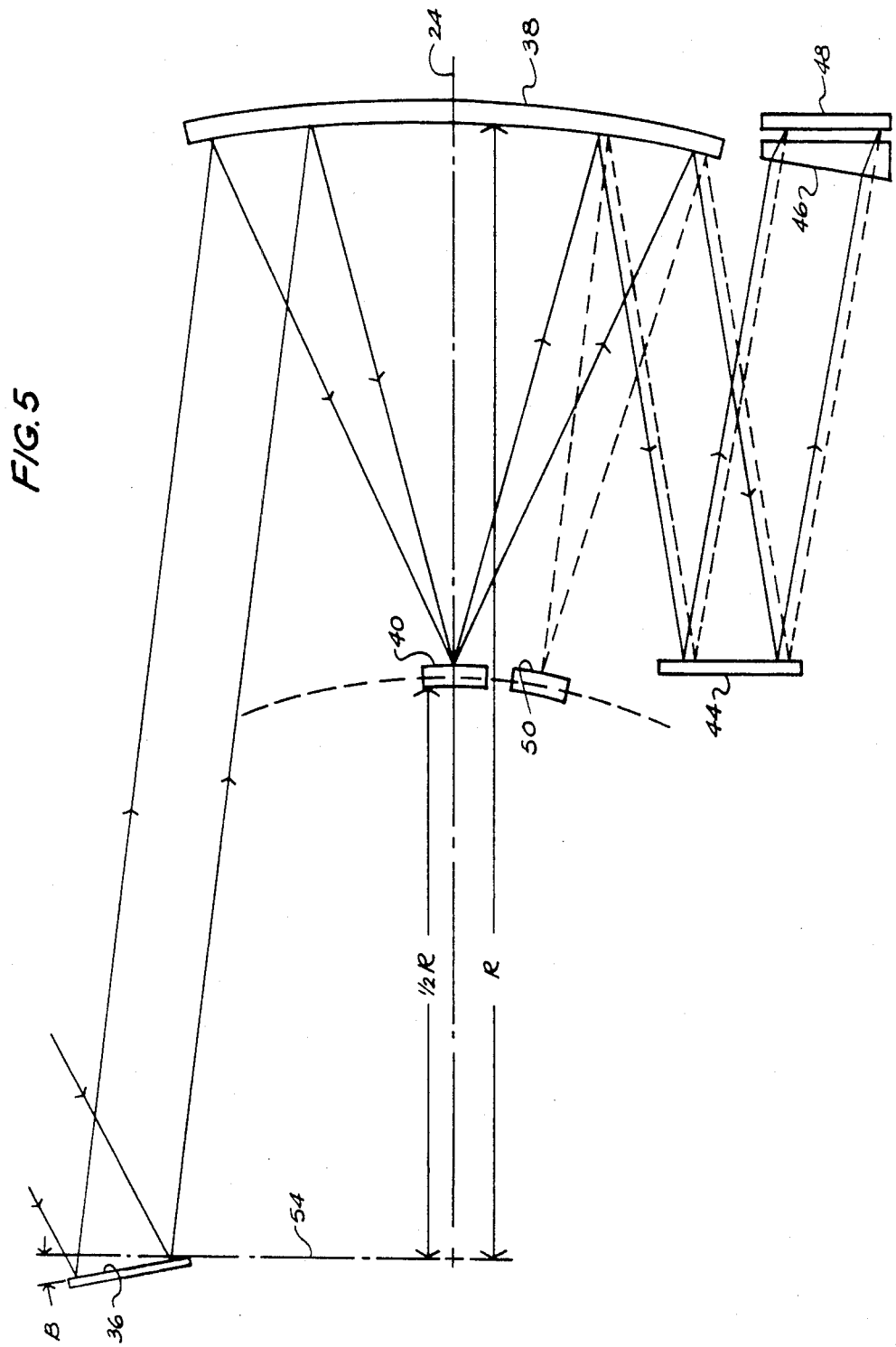

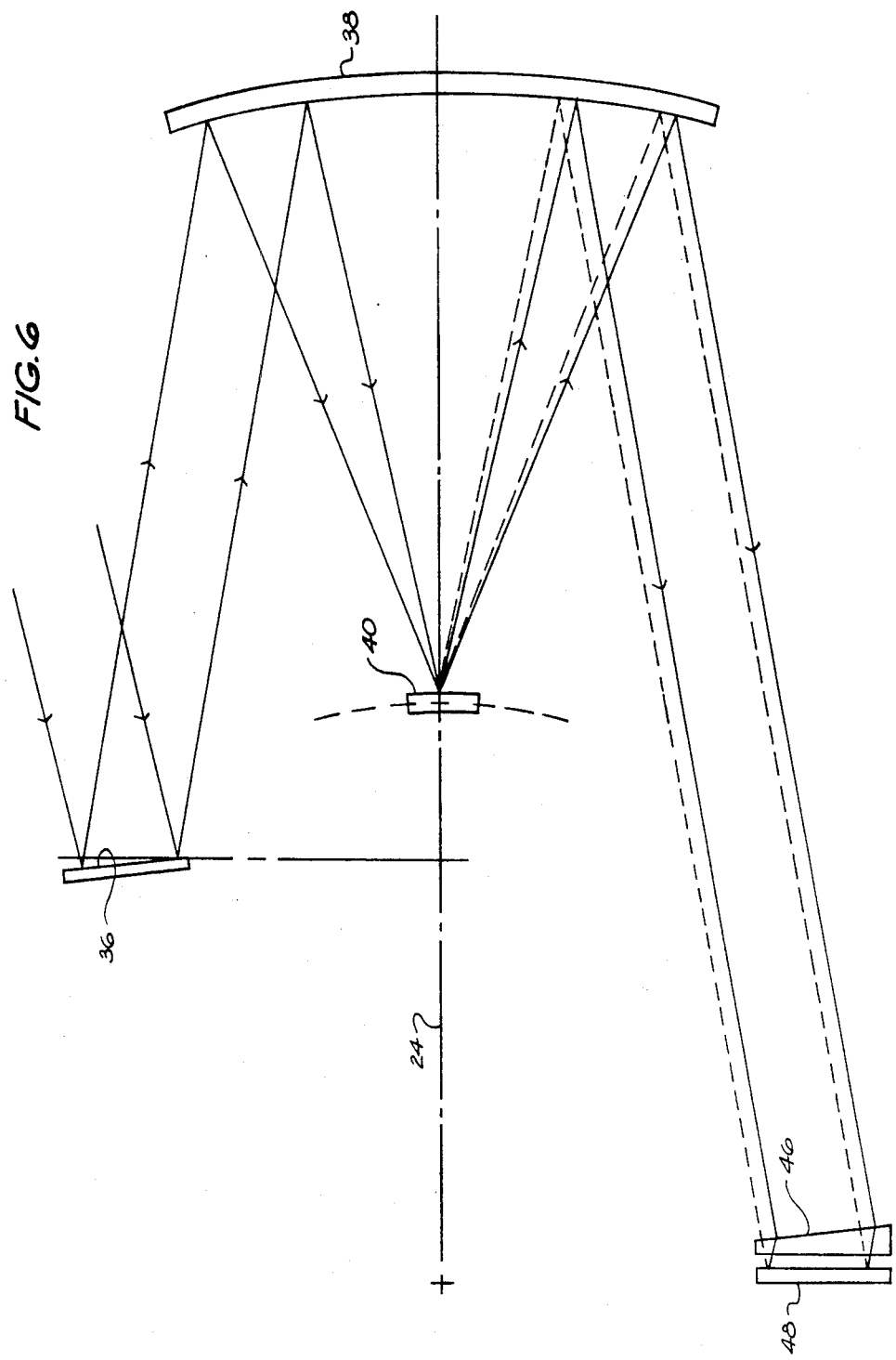

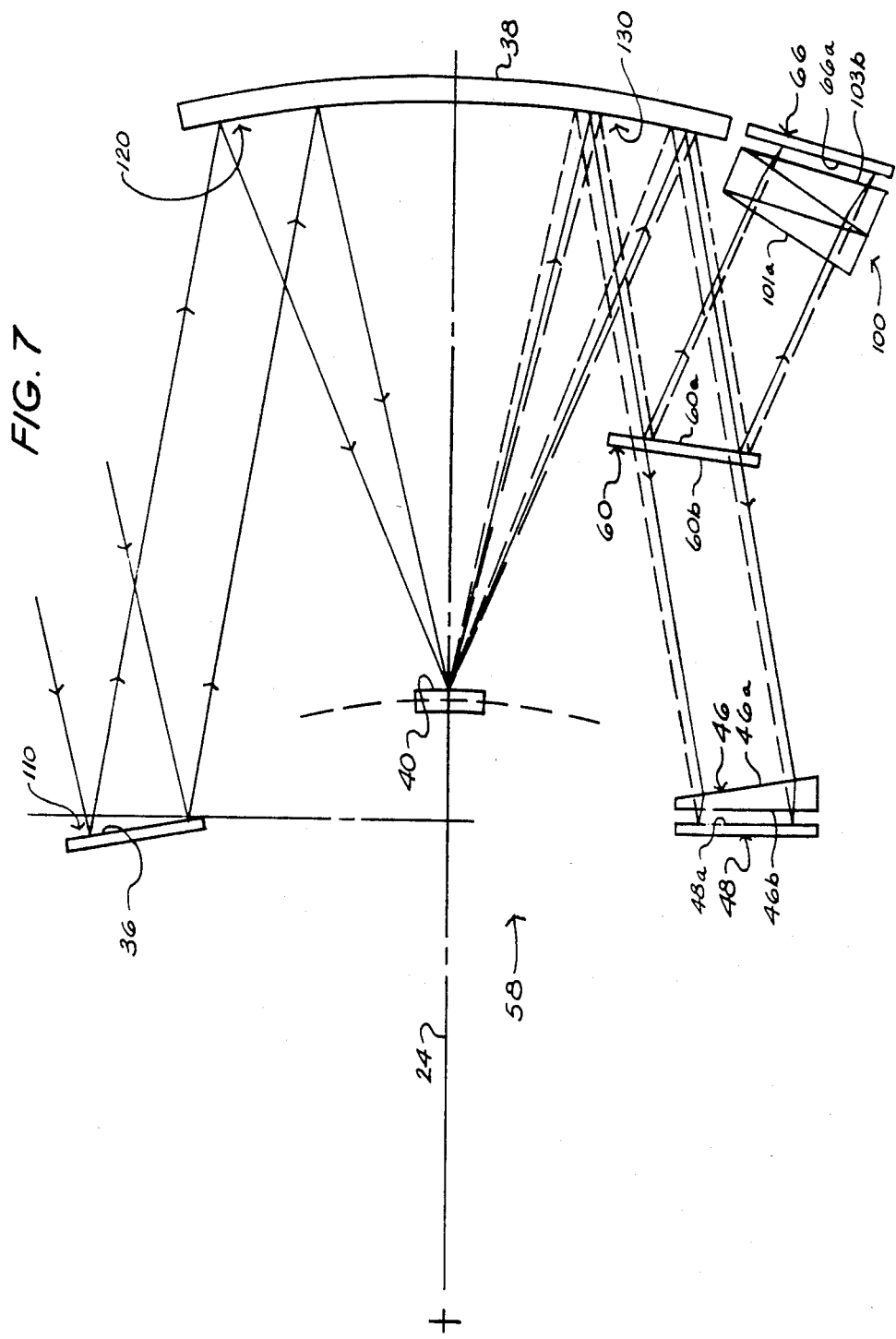

OPTICAL SYSTEM

BACKGROUND OF THE INVENTION

1. Origin of the Invention

The invention described herein was made in the performance of work under a NASA Contract and is subject to the provisions of Section 305 of the National Aeronautics and Space Act of 1958, Public Law 85-568 (72 STAT 435; 43 USC 2457).

2. Field of the Invention

This invention relates to an optical system used in a spacecraft. More particularly, it relates to an optical system in which no lenses are used to focus a spectral and spatial image of a remote surface.

3. Background Discussion

Spacecraft, such as the space shuttle, are utilized to provide detailed information about the surface of the earth. These spacecraft are placed in orbit around the earth and are equipped with an optical system that observes the surface of the earth as the spacecraft orbits. The information in the form of light gathered by the optical system is converted into electrical impulses which are relayed back to a communication station located on the earth. It is desirable to view a relatively large section of the earth's surface and obtain not only visual information, but also analyze the spectral nature of the light being reflected from the earth's surface. The spectral information is data on the nature of the wavelength of light being reflected by the earth's surface.

SUMMARY OF THE INVENTION

This invention provides an optical system which does not use lenses and is adapted to be used in a spacecraft. In the preferred embodiment of this invention both spectral and spatial images of the surface being scanned by the optical system are formed. It includes means for focusing light entering the system on a first focal plane within the system. This focusing means includes an aspheric mirror and a spherical mirror in the optical path between an aperture and the first focal plane. The aspheric and spheric mirrors are aligned relative to each other and to the aperture so that the light passing through the aperture first strikes the aspheric mirror which directs this light to a first segment of the spherical mirror. The spherical mirror is aligned and shaped so that the light reflects off the first segment and is focused at the first focal plane to form a spatial image of the surface.

In the preferred embodiment of this invention, there is also provided second means for focusing the image formed at the first focal plane at a second focal plane within the system. The second means includes a mirror at the first focal plane for reflecting light from the first focal plane to a second segment of the spherical mirror. This lights reflects from the second segment as substantially collimated light. Means in the optical path between the second focal plane and the spherical mirror are provided for dispersing the light into a spectrum of different wavelengths. There is a mirror adjacent the dispersing means for reflecting the dispersed light back into a third segment of the spherical mirror which focuses light at the second focal plane.

The aspheric mirror is tilted with respect to the axis of symmetry of the system so that there is an angle of from about 1.5° to about 5° between the reflecting surface of the aspheric and a line perpendicular to the axis of symmetry. This tilt provides an improved resolution of the image formed at the second focal plane. This tilt also enables an all reflecting system, since no transparent plate is needed as required in a Schmidt optical system. Preferably, the first and second focal planes are in the same geometric plane and, preferably, this geometric plane is a segment of a sphere. The radius of curvature of the first focal plane is about one-half the radius of curvature of the spherical mirror. These focal planes are convex and the spherical mirror is concave.

The means for dispersing the light is preferably a prism. This prism is of a special design so that the light in the red end of the spectrum is dispersed as much or more than the light in the blue-violet end of the spectrum. This prism is an assembly of at least two light diffraction elements which interface in a predetermined relationship such that, when light passes through these elements, it is dispersed into components of different wavelengths, with the components of the shorter wavelengths being dispersed as much as or more than the components of the longer wavelengths. This presents to a receiving surface a distribution pattern in which preselected groupings of the components of differing wavelengths will be dispersed over essentially equal spacing intervals. Normally, the two elements are made of a glass or other transparent material, with one element being of a different chemical composition than the other element.

In another embodiment of this invention, the optical system has a field of view of at least 30° and is adapted to focus the light from the earth's surface onto light-responsive elements of a detecting system carried by the spacecraft, employing for this purpose aspheric and spherical mirrors. The optical system includes an aperture in the spacecraft through which light from the surface enters the system. The aperture has an area defined by a segment of a circle on a cord wherein the area is less than 50% of the total area of the circle. Such an aperture minimizes the aberration in the system. The light passing through the aperture is focused on the light-responsive elements by the aspheric and spherical mirrors which are aligned relative to each other and to the aperture so that light passes through the aperture and first strikes the aspheric mirror which directs this light to a first segment of the spherical mirror. The spherical mirror is aligned and shaped so that the light reflects off the first segment and is focused at the focal plane to form a spatial image of the surface. The light-responsive elements are disposed in the focal plane. This optical system can be designed so that its field of view is 60° or even greater.

This invention has several advantages. As mentioned above, no lenses are used. The aperture is unobstructed. There is a minimum of polarization of light and a wide field of view may be provided. Vignetting is reduced or eliminated and the system provides a relatively large volume which may be used to store the electronic package for processing and transmitting signals to the earth. Most importantly, the optical system provides exceptionally good resolution of the image and provides both a spatial and spectral image.

The features of the present invention can be best understood, together with further advantages thereof, by reference to the following description, taken in connection with the drawings in which like numerals indicate like parts.

BRIEF DESCRIPTION OF THE DRAWINGS

FIG. 5 is a diagrammatic view illustrating the ray path of the optical system shown in FIG. 4;

FIG. 6 is a diagrammatical view of a third embodiment of this invention, showing the ray path of the optical system of this embodiment;

FIG. 7 is a diagrammatical view of a fourth embodiment of this invention, showing the ray path of the optical system of this embodiment;

FIG. 8b is a cross-sectional view taken along line 8b—8b of FIG. 8a.

DETAILED DESCRIPTION OF THE DRAWINGS

Figure 1:
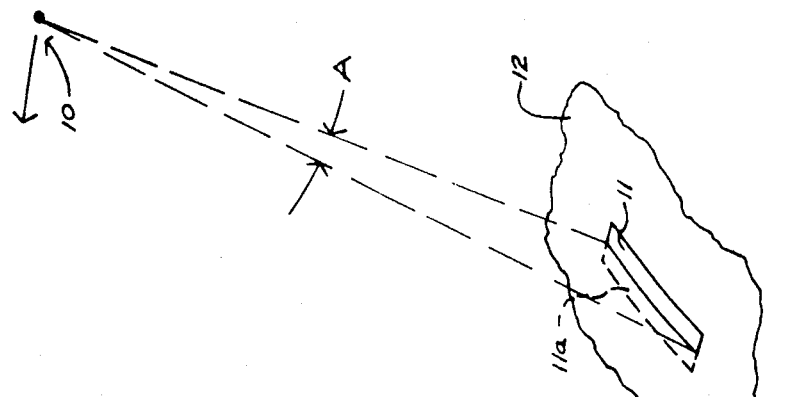
FIG. 1 is a schematic view of a spacecraft employing the optical system of this invention observing a segment of a remote surface about which the spacecraft is orbiting.

Referring to FIG. 1, there is shown a spacecraft 10 in orbit around the earth. As the spacecraft 10 orbits, the optical system contained in the spacecraft observes incremental portions 11, 11a of the earth's surface. The portion 11 is that portion of the earth's surface currently being observed by the spacecraft 10. The portion 11a is the next portion to be observed. Light from these surface portions enter the system as essentially parallel rays.

The system of this invention is designed to observe a surface portion, such as portion 11 of approximately 15 meters wide and 185 kilometers long. The image of this surface portion is approximately 50 microns high and 1 meter wide. This image is converted by the detector equipment 14 (FIG. 2) within the spacecraft into electronic signals which are then relayed to a station on earth. The electronic signals are then reconverted to an optical image which, for example, may be displayed on a screen or converted into a photograph. As the spacecraft advances, the next adjacent portion 11a of the earth's surface is observed and its optical image is converted into an electronic signal which is relayed to the station on earth. This process is repeated so that a continuous signal is generated representing the image of the earth surface beneath the orbiting spacecraft.

Figure 2:
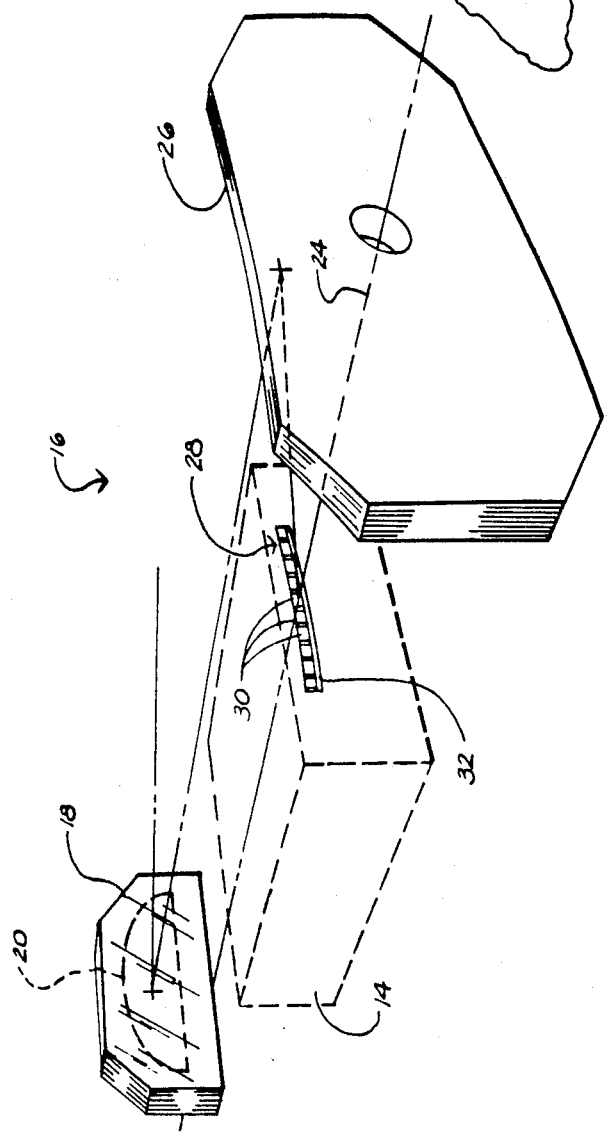
FIG. 2 is a perspective view schematically illustrating one embodiment of the optical system of this invention.
Figure 3:
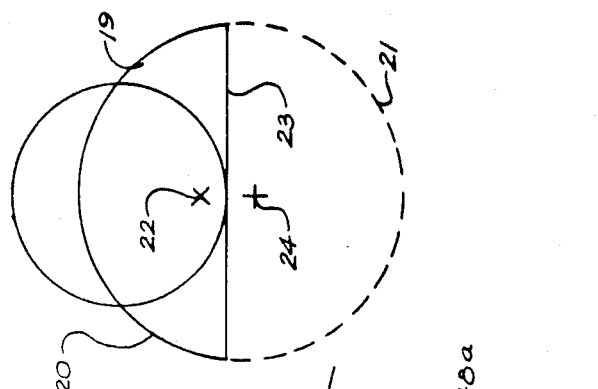
FIG. 3 is a diagrammatic view illustrating the aperture of the optical system of this invention.

In accordance with this invention, the field of view, angle A, may be relatively narrow, for example, 2°, or wide, for example exceeding 30° and, in some instances exceeding 60°. The optical system 16 of this invention, which has such a relatively wide field of view, is depicted in FIG. 2. Light from the earth's surface enters the system 16 and impinges against an aspheric mirror 18. An aperture 20, which may be an opening at the boundary between the spacecraft housing and the aspheric mirror's surface, is depicted as a segment 19 of a circle 21 on a cord 23. This is best illustrated in FIG. 3. An aperture 20 of such design has a centroid 22, which is the effective center of the aperture. The aperture 20 is contrasted with a circular aperture having the same area. Such a circular aperture would have its center more remote from the axis 24 of symmetry of the system than the centroid 23 of the aperture 20. As a consequence, there is a reduction in aberration using the aperture 20.

Referring again to FIG. 2, the light from the aspheric mirror 18 is reflected onto the surface of a spherical mirror 26 which is aligned to focus this light on a detector array 28 including light responsive elements 30 at the focal plane 32. The light activates these light-responsive elements 30, which converts the optical signal into an electrical signal which is relayed to a receiving station.

The prescription of the optical system 16, which has a field of view of 60°, is set forth in Table I.

Figure 4:
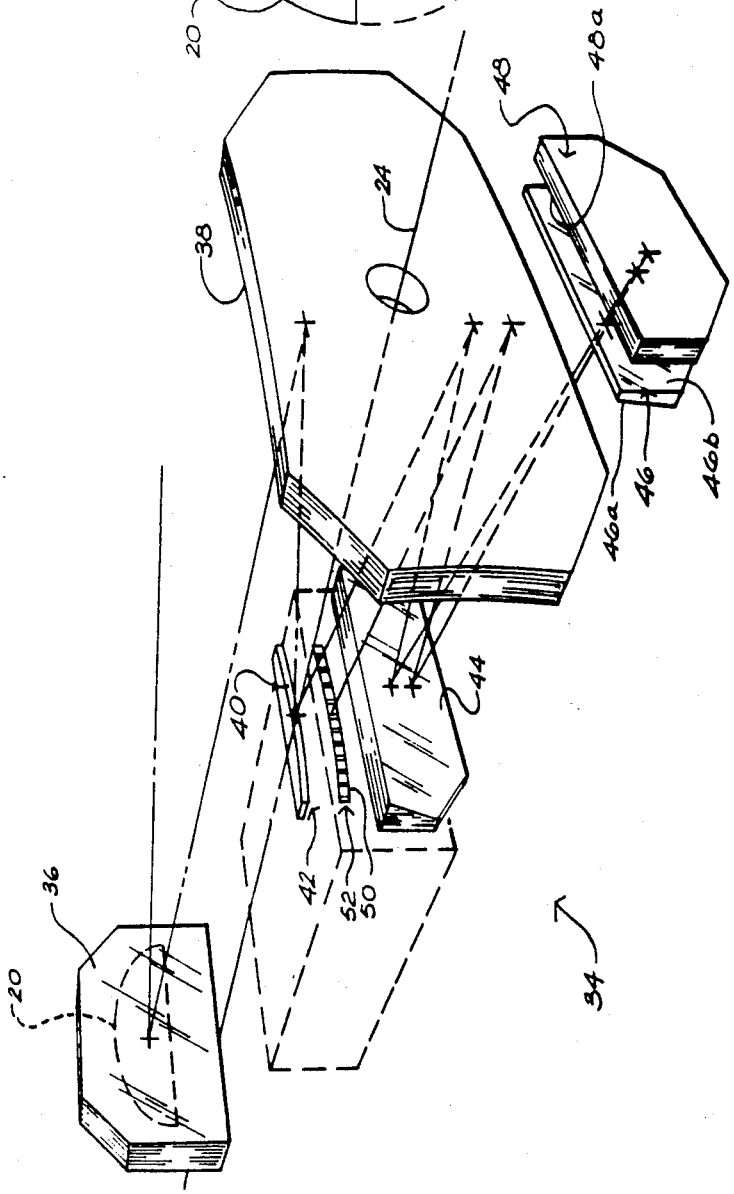
FIG. 4 is a perspective view schematically illustrating another embodiment of this invention.

Another embodiment of this invention is shown in FIG. 4 in which there is provided both a spatial and spectral image of the surface being observed. This system 34 includes an aspheric mirror 36, a spherical mirror 33, a sector of a second spherical mirror 40 at the first optical plane 42 of the system, a flat mirror 44, a prism 46 having front surface 46a and rear surface 46b, a second aspheric mirror 48 having front surface 48a, and a detector array 50 at the second focal plane 52 of the system.

TABLE I

| | Prescription for the wide-angle camera fore-optics | | | | | |
|---|---|---|---|---|---|---|
| Surface No. | Radius of Curvature | Thickness to Next Surface | Figure | Boundary Materials | Tilt Angle | Description |
| 18 with aperture 20 | −.570809E06 | −2384.351 | ASPH [1] | Air/REFL | −3.0° | Schmidt Corrector Mirror |
| 26 | 2389.947 | 1188.487 | Sphere | Air/REFL | — | Schmidt Primary Mirror |
| 28 | 1196.881 | — | Sphere | — | — | Image Surface |

| K | $d_2$ | $d_3$ | $d_4$ | $d_5$ | $d_7$ | $d_8$ | $d_9$ | $d_{10}$ |
|---|---|---|---|---|---|---|---|---|
| [1] 0 | −2.394880E-12 | 2.862696E-16 | −3.553547E-21 | 1.515456E-26 | 1.149663E-00 | 1.012724E-00 | 9.854056E-01 | 1.004577E-10 |

NOTE:
K = Conic Constant, $P = X^2 + Y^2$, C = Curvature
$Z = CP^2/(1 + \sqrt{1 - (K + 1)C^2P^2}) + d_2(d_7X^2 + Y^2)^2 + d_3(d_8X^2 + Y^2)^3 + d_4(d_9X^2 + Y^2)^4 + d_5(d_{10}X^2 + Y^2)^5$
Units are millimeters Light enters the system through the aperture and impinges against the surface of the aspheric mirror 36. This light is then reflected off the surface of the aspheric mirror 36 onto a first segment of the spherical mirror 38. The spherical mirror 38, which is a spectrometer entrance slit and thus forms the system field stop, then focuses this light onto the mirror 40. This mirror 40 then reflects the light onto a second segment of the spherical mirror 38 which then collimates the light and reflects it onto the flat mirror 44. The collimated light then reflects from the surface of the flat mirror and is directed through the prism 46 which disperse the light into its component wavelengths. This dispersed light then impinges against the second aspheric mirror 48 which redirects it again through the prism onto another portion of the flat mirror 44. The flat mirror then reflects it onto a third segment of the spherical mirror, which then focuses the light at the detector array 50.

The ray path of this system is illustrated in FIG. 5. As shown, the aspheric mirror 36 is tilted slightly with respect to the axis of symmetry 24 of the system. This tilt is about a line 54 which is perpendicular to the axis surface 60a and rear surface 60b to separate the infrared portion of the light from the other wavelengths of light and focus the infrared light on a second detector ray 62 (FIG. 8a); and (b) a novel prism assembly 100 to present a light distribution pattern in which preselected groupings of light components of differing wavelengths will be dispersed over essentially equal spacing intervals. Because the infrared light is separated from the other wavelengths, there will be two banks of light responsive elements, one designed particularly to respond to infrared light, the other designed to respond to the others wavelengths of light.

TABLE II

Prescription for the imaging spectrometer free flyer

| Surface No. | Radius of Curvature | Thickness to Next Surface | Figure | Boundary Materials | Tilt Angle | Description |
|---|---|---|---|---|---|---|
| 36 with aperture 20 | −.274969E-07 | −3988.880 | ASPH [1] | Air/REFL | −3° | Fore-Optic Schmidt Corrector Mirror |
| 38 | 3994.422 | 1994.279 | Sphere | Air/REFL | — | Fore-Optic Schmit Primary Mirror |
| 40 | 1989.962 | −1994.279 | Sphere | Air/REFL | — | Reflecting Spectrometer Slit |
| 38 | 3994.422 | 1900.000 | Ellipse [2] | Air/REFL | — | Spectrometer Primary Mirror |
| 44 | ∞ | −2074.423 | Flat | Air/REFL | +6.0° | Spectrometer Fold Mirror |
| 46a | ∞ | −10.000 | Flat | Air/Schott SK3 | −.7129° | Prism Front Surface |
| 46b | ∞ | −10.000 | Flat | Schott SK3/Air | +.7129° | Prism Rear Surface |
| 48 | −.249911E-06 | 10.000 | ASPH [3] | Air/REFL | −2.3094° | Spectrometer Schmidt Corrector Mirror |
| 46a | ∞ | 10.000 | Flat | Air/Schott SK3 | +.7129° | Prism Rear Surface |
| 46b | ∞ | 2074.423 | Flat | Schott SK3/Air | −.7129° | Prism Front Surface |
| 44 | ∞ | −1900.000 | Flat | Air/REFL | +6.0° | Spectrometer Fold Mirror |
| 38 | 3994.422 | 1967.842 | Ellipse [2] | Air/REFL | — | Spectrometer Primary Mirror |
| 52 | 2003.300 | — | Sphere | Detector | — | Spectrometer Focal Surface |

| | K | $d_2$ | $d_3$ | $d_4$ | $d_5$ | $d_7$ | $d_8$ | $d_9$ | $d_{10}$ |
|---|---|---|---|---|---|---|---|---|---|
| [1] | 0 | 1.968729E-12 | 0 | 0 | 0 | 1.004018E-00 | 0 | 0 | 0 |
| [2] | −3.17650E-03 | 0 | 0 | 0 | 0 | 0 | 0 | 0 | 0 |
| [3] | 0 | 3.862525E-01 | 1.619875E-20 | 0 | 0 | 9.989612E-01 | 9.989612E-01 | 0 | 0 |

Units are millimeters
C = Curvature, K = Conic Constant, $P = X^2 + Y^2$
$Z = CP^2/(1 + SQRT(1 - (K + 1)C^2P^2)) + d_2(d_7X^2 + Y^2)^2 + d_3(d_8X^2 + Y^2)^3 + d_4(d_9X^2 + Y^2)^4 + d_5(d_{10}X^2 + Y^2)^5$ of symmetry 24 of the system and is at an angle B of approximately 1.5° to 5°. The two focal planes 40 and 50 are on the same geometric plane, which is a sphere having a radius of approximately one-half the radius of the spherical mirror 38. This spherical geometric plane has the same center as the spherical mirror 38. The reflective surface of the mirror 40 is convex relative to the spherical mirror 38, and the detector ray is convex relative to the spherical mirror. In some instances, however, the detector array 50 may be in a relatively flat plane, but as the field of view of the system increases, it is necessary that the detector array also be convex and spherical.

The prescription of this system 34, which has a field of view of 15°, is set forth in Table II.

FIG. 6 illustrates a third embodiment of this invention which is essentially the same as that shown in FIGS. 4 and 5 except that the flat mirror 44 is eliminated from the system. Here light enters the system through an aperture of the type shown in FIG. 3 and impinges against the aspheric mirror 36 which reflects the light onto the spherical mirror 38. The light reflects off this mirror 38 onto the mirror 40 which directs it to the lower portion of the spherical mirror 38, which then collimates the light and directs it through the prism 46 onto the aspheric mirror 48. The aspheric mirror 48 reflects it through the prism onto another lower portion of the spherical mirror 38, which again refocuses the light at the second focal plane of the system where the detector array (not shown) is located.

Figure 8A:
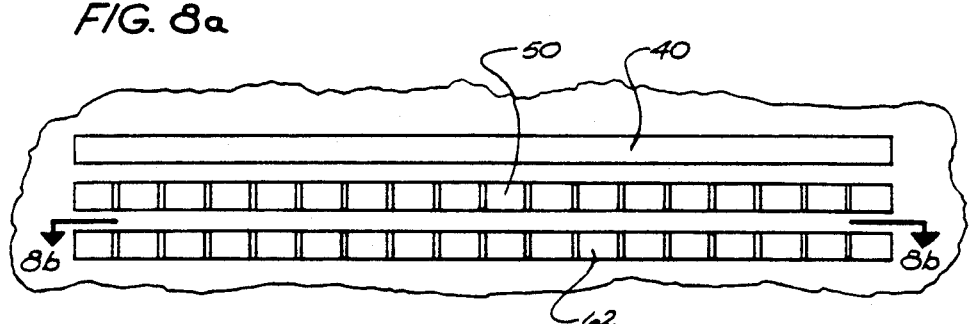
FIG. 8a is a schematic view of the detector array employed in the optical system shown in FIG. 7.
Figure 8B:
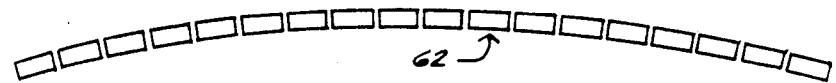

As shown in FIGS. 7, 8a and 8b, a fourth embodiment of this invention is illustrated which is essentially the same as that shown in FIG. 6, except in this system 58 there is employed (a) a dichroic mirror 60 having front The detector array 62 which responds to the infrared light is maintained at a temperature of approximately 50° to 70° K. This detector array 62 comprises a plurality of light-responsive elements which are located adjacent each other in the form of an arc on the surface of a sphere. There is a slight spacing between adjacent elements.

Light enters the system 58 through an aperture such as shown in FIG. 3 and is reflected off the surface 110 of the aspheric mirror 36 onto the upper surface portion 120 of the spherical mirror 38. The spherical mirror then focuses the light onto the mirror 40 which redirects the light onto a lower surface portion 130 of the spherical mirror. This light is then collimated by the spherical mirror and directed onto the dichroic mirror 60 disposed between the spherical mirror and the prism 46. The infrared light will reflect off the surface 60a of the dichroic mirror through the second prism assembly 100 which then disperses the light. There is a third aspheric mirror 66, including surface 66a, adjacent the prism assembly 100 which reflects the light back through the prism assembly onto the dichroic mirror 60. This infrared light is then reflected by the dichroic mirror onto a lower surface portion 130 of the spherical mirror 38 which reflects it onto the detector array 62 shown in FIG. 8a. The noninfrared spectrum of the collimated light passes through the dichroic mirror 60 and through the first prism 46, into the surface 46a and out surface 46b, to the surface 48a of the aspheric mirror 48. This mirror 48 then redirects the light back through the prism 46 and the dichroic mirror 60 onto the spherical mirror 28 which reflects it onto detector array 50. The light responsive elements of both arrays then convert the light images into electrical signals which are transmitted to a receiving station.

Figure 9:
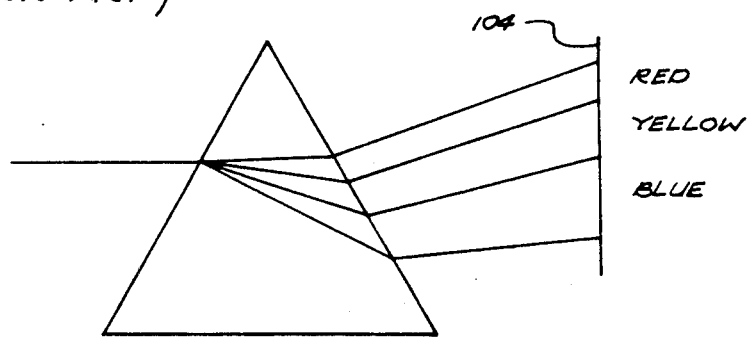
FIG. 9 is a diagrammatic view of a conventional prism.

As discussed above, the optical systems of this invention may employ dispersing means to provide not only a spatial but a spectral image of the surface being observed. These dispersing means could be a diffraction grating, however, prisms are preferred. As shown in FIG. 9, a conventional prism will disperse the light into its component wavelengths as illustrated. Visible light will basically be divided into three broad categories or groupings of wavelengths. Those in the red portion of the spectrum which have a wavelength ranging from 600 to 680 nanometers, those in the yellow portion having a wavelength from 510 to 600 nanometers, and those in the blue/violet portion having a wavelength from 390 to 480 nanometers. A conventional prism will, however, display the light of these various groupings in a nonuniform manner. That is, for equal spacing intervals along the receiving surface 104, there will be an unequal distribution of light, with the red light being compressed and the blue light being more highly dispersed.

Figure 10:
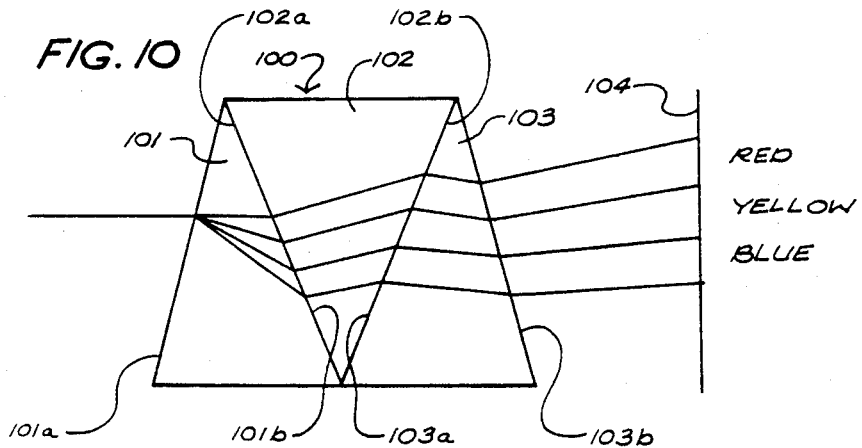
FIG. 10 is a diagrammatical view of the prism used in the optical system of this invention.

As shown in FIG. 10, the prism assembly 100 in accordance with this invention is provided where the light passing through it is distributed in a uniform manner over the receiving surface so that it will be dispersed over essentially equal spacing intervals. This prism assembly 100 includes at least two, and preferably, three elements 101, 102, 103 which interface in a predetermined manner such that the light in the red, yellow, and blue/violet grouping will be dispersed in a near uniform manner over equal spacing intervals on the receiving surface 104. Element 101 has front surface 101a and rear surface 101b, element 102 has front surface 102a and rear surface 102b, and element 103 has front surface 103a and rear surface 103b. Preferably these elements are made of a transparent material such as glass with each element having a slightly different chemical composition than the other elements.

The prescription of the optical system 58, including prism assembly 100, is set forth in Table III. The optical system 58 has a flat field of view of 1.5°.

The above description presents the best mode contemplated of carrying out the present invention. This invention is, however, susceptible to modifications and alternate constructions from the embodiments shown in the drawing and described above. It is not the intention to limit this invention to the particular embodiment disclosed; but on the contrary, the invention is to cover all modifications, equivalencies, and alternative constructions falling within the spirit and scope of the invention as expressed in the appended claims.

TABLE III

Optical prescription for the Shuttle Imaging Spectrometer

| Surface No. | Radius of Curvature | Thickness to Next Surface | Figure | Boundary Materials | Tilt Angle | Description |
|---|---|---|---|---|---|---|
| 110 | −.114E07 | −1244.871 | ASPH [1] | Air/REFL | 3° | Fore-Optic Corrector |
| 120 | 1249.127 | 623.883 | Sphere | Air/REFL | — | Fore-Optic Primary |
| 40 (FIG. 8a) | 635.914 | −623.883 | Sphere | Air/REFL | — | Reflecting Spectrometer Slit |
| 130 | 1249.127 | 600.000 | ASPH [2] | Air/REFL | — | Spectrometer Primary |
| 60a | ∞ | 10.000 | Flat | Air/Schott PK2 | −10.000° | 1st Surface Beam Splitter |
| 60b | ∞ | 371.000 | Flat | Schott PK2/Air | −10.000° | 2nd Surface Beam Splitter |
| 160 | ∞ | 25.000 | Flat | Air/Schott IRNG 6 | −4.799° | 1st Surface Prism |
| 170 | ∞ | 10.000 | Flat | Schott IRNG 6/Air | 3.114° | 2nd Surface Prism |
| 180 | .128623E 07 | Double Pass Back | ASPH [3] | Air/REFL | 5.145° | SWIR Spectrometer Corrector |
| 60a | ∞ | −365.000 | Flat | Air/REFL | −10.000° | 1st Surface Beam Splitter |
| 101a | ∞ | −14.000 | | Air/Schott LAF 22 | 1.6388° | 1st Surface Prism Element 1 |
| 101b | ∞ | −3.000 | | Schott LAF 22/Air | 0.1155° | 2nd Surface Prism Element 1 |
| 102a | ∞ | −1.000 | | Air/Schott LAK 8 | 0.1155° | 1st Surface Prism Element 2 |
| 102b | ∞ | −3.000 | | Schott LAK 8/Air | 4.6696° | 2nd Surface Prism Element 2 |
| 103a | ∞ | −40.000 | | Air/Schott SF5 | 4.6696° | 1st Surface Prism Element 3 |
| 103b | ∞ | 0.000 | | Schott SF5/Air | −7.8161° | 2nd Surface Prism Element 3 |
| 66a | −.400946E.06 | Double Pass Back | ASPH [4] | Air/REFL | 5.0420° | VSNIR Spectrometer Corrector |

| | K | $d_2$ | $d_3$ | $d_4$ | $d_5$ | $d_7$ | $d_8$ | $d_9$ | $d_{10}$ |
|---|---|---|---|---|---|---|---|---|---|
| [1] | 0 | 6.416086E-11 | 5.113777E-17 | 2.206722E-22 | 0 | 9.975763E-01 | 9.994509E-01 | 9.981655E-01 | 0 |
| [2] | 2.15473E-01 | 0 | 0 | 0 | 0 | 0 | 0 | 0 | 0 |
| [3] | 0 | 1.617446E-10 | 6.042860E-18 | 1.888953E-21 | −2.815980E-26 | 1.015696E-00 | 1.039490E-01 | 9.088831E-01 | −2.131628E-14 |
| [4] | 0 | 1.550727E-10 | 2.325046E-16 | −5.989486E-22 | 1.946440E-31 | 1.043314E-00 | 9.049257E-01 | 1.072332E-00 | 7.758094E-01 |

Units are millimeters
NOTE:
C = Curvature, K = Conic Constant, P = $X^2 + Y^2$
Z = $CP^2/(1 = SQRT(1 − (K = L)C^2P^2)) + d_2(d_7X^2 + Y^2)^2 + d_3(d_8X^2 + Y^2)^3 + d_4(d_9X^2 + Y^2)^4 + d_5(d_{10}X^2 + Y^2)^5$

We claim:
1. An optical system adapted to be used at elevations high above a surface and for forming a spectral and spatial image of the surface, comprising:
entrance aperture means through which light from the surface enters the system;
first means for focusing light passing through the entrance aperture means on a first focal plane within the system, said first means including
aspheric mirror means and spherical mirror means in the optical path between the entrance aperture means and the first focal plane,
said aspheric and spherical mirror means aligned relative to each other and the entrance aperture means so that the light passing through the entrance aperture means first strikes the aspheric mirror means which directs this light to a first segment of the spherical mirror means, and wherein said spherical mirror means is aligned and shaped so that said light reflects off the first segment and is focused at the first focal plane to form a spatial image of said surface; and
second means for providing a spectral image of the surface and for focusing this image at a second focal plane within the system, including
mirror means at the first focal plane for reflecting light from the first focal plane to a second segment of the spherical mirror means, with the light re- flecting from said second segment being substantially collimated, dispersing means in the optical path between the second focal plane and the spherical mirror means for dispersing the light into a spectrum of different wavelengths, and means for focusing the light at different wavelengths exiting the dispersing means at the second focal plane to form thereat a spectral and spatial image of said surface.

2. The optical system of claim 1 wherein the aspheric mirror means is tilted with respect to the axis of symmetry of the system so that there is an angle of from about 1.5 to about 5.0 degrees between the reflecting surface of the aspheric mirror means and a line perpendicular to the axis of symmetry.

3. The optical system of claim 1 wherein the first and second focal planes are adjacent each other in the same geometric plane.

4. The optical system of claim 1 wherein the first focal plane is spherical.

5. The optical system of claim 4 wherein the radius of curvature of the first focal plane is one-half the radius of curvature of the spherical mirror means.

6. The optical system of claim 1 wherein the means for focusing the light at the second focal plane include the spherical mirror means and a reflective surface which directs light onto a third segment of the spherical mirror means, said third segment reflecting the light onto the second focal plane and focusing this light at said second focal plane.

7. The optical system of claim 6 wherein the reflective surface is an aspherical mirror adjacent the dispersing means such that light first passes through the dispersing means, strikes the aspherical mirror, which then reflects it back through the dispersing means to the third segment of the spherical mirror means.

8. The optical system of claim 7 wherein there is a generally flat mirror disposed in the optical path between the prism and the spherical mirror means.

9. The optical system of claim 6 wherein the dispersing means is a prism.

10. An optical system adapted to be used at elevations high above a surface to form a spectral and spatial image of the surface, comprising:

aperture means through which light from the surface enters the system as essentially parallel rays;

first means for focusing the light entering the aperture means at a first focal plane having a curved surface corresponding to a convex segment of a sphere, said first means employing only stationary mirror means as the optical elements for focusing the light at said first focal plane;

second means for focusing light at a second focal plane having a curved surface corresponding to a convex segment of a sphere, said second means employing only stationary mirror means as the optical elements to reflect the light from the first focal plane to the second focal plane as substantially collimated light along a predetermined optical path, and light dispersing means along the optical path for dispersing said collimated light as a spectrum of different wavelengths so that light of different wavelengths is focused at the second focal plane to form a spectral and spatial image of said surface at the second focal plane.

11. The optical system of claim 10 wherein the first means includes aspheric mirror means tilted with respect to the axis of symmetry of the system so that there is an angle of from about 1.5 to 5.0 degrees between the reflecting surface of the aspheric mirror means and a line perpendicular to the axis of symmetry.

12. The optical system of claim 10 wherein the stationary mirror means in both the first means and the second means are adapted to minimize spherical aberration.

13. The optical system of claim 12 wherein the stationary mirror means include at least two aspherical mirrors, one in the optical path between the aperture means and the first focal plane and the other adjacent the aperture means.

14. The optical system of claim 10 wherein the aperture means has an area defined by a segment of a circle on a cord wherein the area is less than 50 percent of the total area of the circle.

15. The optical system of claim 10 wherein a spherical mirror is employed to reflect light onto both the first focal plane and the second focal planes.

16. The optical system of claim 15 wherein the spherical mirror is disposed along the optical path between two aspheric mirrors.

17. The optical system of claim 16 wherein the light dispersing means is a prism that is disposed along the optical path between one of the aspheric mirrors and the spherical mirror, with a flat reflective surface disposed between the spherical mirror and the prism on the side of the prism opposite the aspheric mirror.

18. An optical system having a wide field of view and adapted to be used at elevations high above a surface to form, without the aid of lenses, a spectral and spatial image of the surface, comprising:

aperture means through which light from the surface enters the system as substantially parallel rays;

first mirror means for focusing the light entering the pupil means at a first focal plane;

means for reflecting the light focused at the first focal plane along an optical path to a second focal plane;

means, along said optical path in advance of said second focal plane, for collimating the light;

means, along said optical path between said means for collimating and said second focal plane, for dispersing the collimated light into a spectrum of different wavelengths; and means, between the dispersing means and the second focal plane, for focusing light of different wavelengths at said second focal plane to form a spectral and spatial light image of said surface.

19. The optical system of claim 18 wherein the first mirror means includes aspheric mirror means tilted with respect to the axis of symmetry of the system so that there is an angle of from about 1.5 to about 5.0 degrees between the reflecting surface of the aspheric mirror means and a line perpendicular to the axis of symmetry.

20. The optical system of claim 18 wherein the dispersing means is a prism.

21. The optical system of claim 20 wherein the prism includes at least two light diffraction elements interfacing in a predetermined relationship such that, when light passes through the elements, it is dispersed into components of different wavelengths, with the components of shorter wavelengths being dispersed more than the components of longer wavelength to present to a receiving surface a distribution pattern in which preselected groupings of the components of differing wavelengths will be dispersed over essentially equal spacing intervals.

22. The optical system of claim 21 wherein the two light diffraction elements are of different chemical composition.

23. The optical system of claim 18 including dichroic mirror means along the optical path between the collimating means and the dispersing means which direct the infrared components of the light onto a different portion of the second focal plane than the other components of the light.

24. The optical system of claim 18 including spherical mirror means which reflect light onto both the first and second focal planes simultaneously.

25. The optical system of claim 24 wherein collimated light is reflected from the surface of the spherical mirror means onto a flat mirror which reflects said collimated light into the dispersing means.

26. The optical system of claim 25 including mirror means adjacent the dispersing means which reflect light exiting the dispersing means back through the dispersing means onto the flat mirror, which in turn reflects the light onto the spherical mirror means which in turn reflects it onto the second focal plane.

27. The optical system of claim 26 wherein the aperture means has an area defined by a segment of a circle on a cord, wherein the area is less than 50 percent of the total area of the circle.

28. The optical system of claim 25 wherein the spherical mirror means is disposed along the optical path between two aspheric mirrors.

29. The optical system of claim 18 having a field of view in excess of about 30°.

30. The optical system of claim 18 wherein the field of view is between about 2° and about 60°.

31. The optical system of claim 18 wherein the first focal plane and the second focal plane are adjacent each other in the same geometric plane.

32. In a space craft, an optical system having a field of view of at least 30° and adapted to focus light from the surface of object in space onto a light responsive surface of a detecting system carried by the spacecraft, said optical system including aperture means in the spacecraft through which light from the surface enters the system, said aperture means having an area defined by a segment of a circle on a cord wherein the area is less than 50 percent of the total area of the circle, and means for focusing light passing through the aperture means on the light responsive surface, said focusing means including aspheric mirror means and spherical mirror means in the optical path between the aperture means and the first focal plane, said aspheric mirror means and said spherical mirror means being aligned relative to each other and the aperture means so that the light passing through the aperture means first strikes the aspheric mirror means which directs this light to the spherical mirror means, and said spherical mirror means being aligned and shaped so that said light reflects off the first segment and is focused at the first focal plane to form a spatial image of said surface.

* * * * *